United States Patent

Russo et al.

[11] Patent Number: 6,001,142
[45] Date of Patent: Dec. 14, 1999

[54] POLYOXYALKYLENE URETHANE AND FUEL COMPOSITION CONTAINING SAME

[75] Inventors: Joseph M. Russo, Poughkeepsie, N.Y.; Thomas F. DeRosa, Wallingford, Conn.; Benjamin J. Kaufman, Hopewell Junction, N.Y.

[73] Assignee: Texaco Inc., White Plains, N.Y.

[21] Appl. No.: 09/187,494

[22] Filed: Nov. 6, 1998

[51] Int. Cl.[6] ....................................................... C10L 1/22
[52] U.S. Cl. ............................................. 44/387; 560/166
[58] Field of Search ................................ 44/387; 508/464; 560/166

[56] References Cited

U.S. PATENT DOCUMENTS

| | | | |
|---|---|---|---|
| 3,652,240 | 3/1972 | Dorn et al. | 44/387 |
| 4,568,663 | 2/1986 | Mauldin | 502/325 |
| 4,778,481 | 10/1988 | Courtney | 44/387 |
| 4,866,142 | 9/1989 | Gutierrez et al. | 44/387 |
| 5,234,478 | 8/1993 | Su et al. | 44/419 |
| 5,292,989 | 3/1994 | Davis | 585/751 |
| 5,348,560 | 9/1994 | Mohr et al. | 44/387 |
| 5,348,982 | 9/1994 | Herbolzheimer et al. | 518/700 |
| 5,378,348 | 1/1995 | Davis et al. | 208/27 |
| 5,383,942 | 1/1995 | Su et al. | 44/334 |
| 5,509,943 | 4/1996 | Herbstman et al. | 44/387 |
| 5,527,364 | 6/1996 | Russo et al. | 44/349 |
| 5,545,674 | 8/1996 | Behrmann et al. | 518/715 |
| 5,863,302 | 1/1999 | Carey et al. | 44/387 |

FOREIGN PATENT DOCUMENTS

WO 98/47987  10/1998  WIPO .

OTHER PUBLICATIONS

Colloidal Systems & Interfaces, Ross, Sydney; Morrison, Ian; John Wiley & Sons Publishers, pp. 267–293, New York, 1988.

Primary Examiner—Margaret Medley
Attorney, Agent, or Firm—Henry H. Gibson; Dilworth & Barrese

[57] ABSTRACT

A hydrocarbyl polyoxyalkylene urethane of the general formula

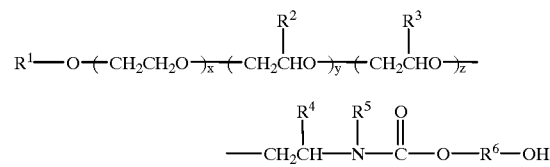

wherein $R^1$ is an alkyl, an alicyclic or an alkylalicyclic radical having from about 4 to about 30 carbon atoms or an alkylaryl where the alkyl group is from about 4 to about 30 carbon atoms; x is an integer from 0 to about 5, y is an integer from 1 to about 49, z is an integer from 1 to about 49 and the sum of x+y+z is equal to 3 to about 50; $R^2$ and $R^3$ each is different and is an alkyl group of from 1 to 4 carbon atoms and each oxyalkylene radical can be any combination of repeating oxyalkylene units to form block or random copolymers; $R^4$ is the same as $R^2$ or $R^3$; $R^5$ is hydrogen or

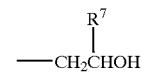

where $R^7$ is hydrogen or an alkyl group of from 1 to 5 carbon atoms and $R^6$ is an divalent alkylene radical of 1 to about 12 carbon atoms which is unsubstituted or substituted with at least one hydrocarbyl substituent of from 1 to about 50 carbon atoms and an internal combustion engine fuel composition containing same are provided.

22 Claims, No Drawings

POLYOXYALKYLENE URETHANE AND FUEL COMPOSITION CONTAINING SAME

BACKGROUND OF THE INVENTION

This invention relates to a hydrocarbyl polyoxyalkylene urethane and to an internal combustion engine fuel composition containing same.

The combustion of fuel in an internal combustion engine typically results in the formation and accumulation of deposits on various parts of the combustion chamber and on the fuel intake and exhaust systems of the engine. The presence of these deposits in the combustion chamber often result in the following problems: (1) reduction in the operating efficiency of the engine; (2) inhibition in the heat transfer between the combustion chamber and the engine cooling system; and (3) reduction in the volume of the combustion zone which can cause a higher than design compression ratio in the engine. A knocking engine can also result from deposits forming and accumulating in the combustion chamber. A prolonged period of a knocking engine can result in stress fatigue and wear in engine components such as, for example, pistons, connecting rods bearings and cam rods.

The formation and accumulation of intake valve deposits can interfere with valve closing which eventually can result in valve burning. Such deposits can also interfere with valve motion and valve seating which tend to reduce the volumetric efficiency of the engine and limit the maximum design power.

Deposits can also collect in the tubes and runners that are part of the exhaust gas recirculation (EGR) flow. The collection of these deposits can reduce the EGR flow. This will result in a knocking engine and an increase in nitric oxide emissions.

In view of the foregoing problems associated with the formation and accumulation of deposits in the combustion chamber and fuel intake and exhaust systems of an internal combustion engine, efforts have been made to develop fuel additives which will inhibit the deposition of deposits in the engine. Illustrative of such fuel additives are the amino alkanolamines of U.S. Pat. Nos. 5,234,478 and 5,383,942 and the alkylphenoxypolyoxyalkylene amine lactones of U.S. Pat. No. 5,527,364.

SUMMARY OF THE INVENTION

In accordance with the present invention, a hydrocarbyl polyoxyalkylene urethane is provided which possesses the general formula

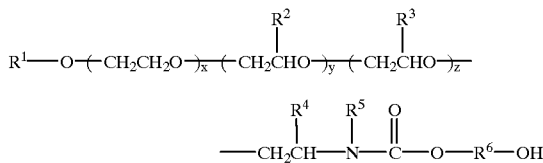

wherein $R^1$ is an alkyl, an alicyclic or an alkylalicyclic radical having from about 4 to about 30 carbon atoms or an alkylaryl where the alkyl group is from about 4 to about 30 carbon atoms; x is an integer from 0 to about 5, y is an integer from 1 to about 49, z is an integer from 1 to about 49 and the sum of x+y+z is equal to 3 to about 50; $R^2$ and $R^3$ each is different and is an alkyl group of from 1 to 4 carbon atoms and each oxyalkylene radical can be any combination of repeating oxyalkylene units to form block or random copolymers; $R^4$ is the same as $R^2$ or $R^3$; $R^5$ is hydrogen or

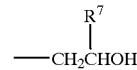

wherein $R^7$ is hydrogen or an alkyl group of from 1 to 5 carbon atoms; and $R^6$ is a divalent alkylene radical having from 1 to about 12 carbon atoms which is unsubstituted or substituted with at least one hydrocarbyl substituent of from 1 to about 50 carbon atoms.

It shall be understood herein that the oxyalkylene groups constituting the polyoxyalkylene chain in the foregoing general formula can be in random or block sequence.

Further in accordance with this invention, a method for the preparation of the foregoing hydrocarbyl polyoxyalkylene urethane is provided which comprises reacting a hydrocarbyl polyoxyalkylene amine of the general formula

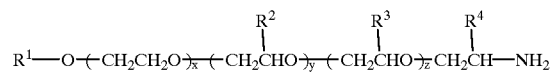

wherein $R^1$ is an alkyl, an alicyclic or an alkyl alicyclic radical having from about 4 to about 30 carbon atoms or an alkylaryl where the alkyl group is from about 4 to about 30 carbon atoms; x is an integer from 0 to about 5, y is an integer from 1 to about 49, z is an integer from 1 to about 49 and the sum of x+y+z is equal to 3 to about 50; $R^2$ and $R^3$ each is different and is an alkyl group of from 1 to 4 carbon atoms and each oxyalkylene radical can be any combination of repeating oxyalkylene units to form block or random copolymers; and $R^4$ is the same as $R^2$ or $R^3$ with a carbonate of the general formula:

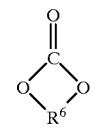

wherein $R^6$ is a divalent alkylene radical of from 1 to about 12 carbon atoms which is unsubstituted or substituted with at least one hydrocarbyl substitutent of from 1 to about 50 carbon atoms to provide the product hydrocarbyl polyoxyalkylene urethane of the general formula

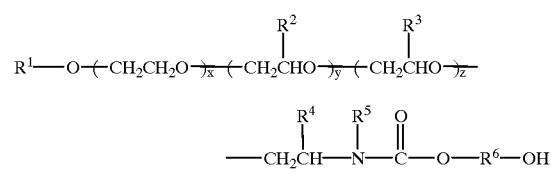

wherein $R_1$, $R^2$, $R^3$, $R^4$, $R^6$, x, y and z have the aforestated meanings and $R^5$ is hydrogen or

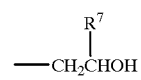

wherein $R^7$ is hydrogen or an alkyl group of from 1 to 5 carbon atoms.

Still further in accordance with the present invention, a fuel composition is provided which comprises a major amount of an internal combustion engine fuel and a fuel combustion deposit-inhibiting amount of at least one hydrocarbyl polyoxyalkylene urethane of the general formula

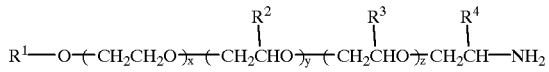

wherein $R^1$, $R^2$, $R^3$, $R^4$, $R^5$, $R^6$, x, y and z have the aforestated meanings.

Yet further in accordance with the present invention, a method for inhibiting the deposition of fuel combustion deposits in an internal combustion engine is provided which comprises operating the engine employing as the fuel therefor a fuel composition which comprises a major amount of an internal combustion engine fuel and a fuel combustion deposit-inhibiting amount of at least one hydrocarbyl polyoxyalkylene urethane of the general formula

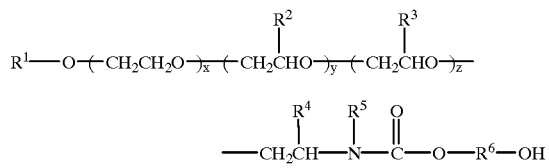

wherein $R^1$, $R^2$, $R^3$, $R^4$, $R^5$, $R^6$, x, y and z have the aforestated meanings.

DESCRIPTION OF THE PREFERRED EMBODIMENTS

The hydrocarbyl polyoxyalkylene urethane of this invention possesses the general formula

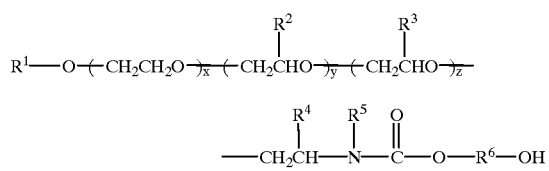

wherein x is an integer from 0 to about 5, y is an integer from 1 to about 49, preferably from about 5 to about 40 and more preferably from about 5 to about 10, z is an integer from 1 to about 49, preferably from about 5 to about 40 and more preferably from about 5 to about 10 and the sum of x+y+z is equal to about 50; $R^1$ is an alkyl, an alicyclic or an alkyl alicyclic radical having from about 4 to about 30 carbon atoms or an alkylaryl where the alkyl group is from about 4 to about 30 carbon atoms, including, by way of illustration, unsubstituted straight or branched aliphatic, cycloaliphatic and aromatic groups and cycloaliphatic and aromatic groups substituted with one or more straight or branched aliphatic, cycloaliphatic and/or aromatic groups.

Thus, for example, $R_1$ can be represented by the general formula

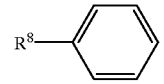

wherein $R^8$ is a hydrocarbyl group of from about 4 to about 30 carbon atoms including, by way of example, a monovalent aliphatic radical having from about 6 to about 24 carbon atoms, preferably from about 8 to about 20 carbon atoms and more preferably from about 9 to about 18 carbon atoms. $R^2$ and $R^3$ each is different and is an alkyl group of from 1 to 4 carbon atoms and each oxyalkylene radical can be any combination of repeating oxyalkylene units to form block or random copolymers; $R^4$ is the same as $R^2$ or $R^3$; $R^5$ is hydrogen or

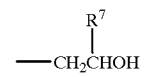

where $R^7$ is hydrogen or an alkyl group of from 1 to 5 carbon atoms; and $R^6$ is a divalent alkylene radical of from 1 to about 12 carbon atoms which is unsubstituted or substituted with at least one hydrocarbyl substituent of from 1 to about 50 carbon atoms. A preferred hydrocarbyl polyoxyalkylene urethane for use herein as a fuel additive is represented by the following formula

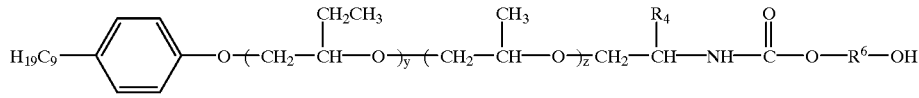

wherein the average value of y is from about 7 to about 8, the average value of z is about half that of y, i.e., from about 3.5 to about 4, with the ratio of y to z being from about 1 to about 3 and preferably from about 1.5 to about 2, $R^4$ is —$CH_3$ or —$CH_2CH_3$ and $R^6$ is an optionally substituted alkylene radical of from about 2 to about 5 carbon atoms.

The foregoing hydrocarbyl polyoxyalkylene urethane of this invention can be obtained by reacting a hydrocarbyl polyoxyalkylene amine of the general formula

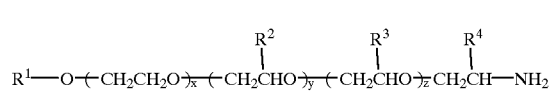

wherein $R^1$, $R^2$, $R^3$, $R^4$, x, y and z have the aforestated meanings with a carbonate of the general formula:

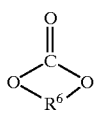

wherein $R^6$ has the aforestated meaning.

Representatives of the hydrocarbyl polyoxyalkylene amine are known in the art, e.g., in U.S. Pat. Nos. 5,234,478, 5,383,942 and 5,527,364, the contents of which are incorporated by reference herein. In general, the hydrocarbyl polyoxyalkylene amine can be prepared by first reacting an alcohol represented by the general formula $$R^1—OH$$

wherein $R^1$ has the aforestated meaning with at least two 1,2-epoxides represented by the general formulae

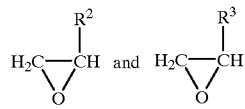

wherein $R^2$ and $R^3$ have the aforestated meanings. Optionally, a small amount of ethylene oxide, e.g., up to about 35 percent, can be added to the foregoing reaction to provide a hydrocarbyl polyoxyalkylene hydroxide represented by the general formula

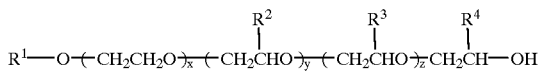

wherein $R^1$, $R^2$, $R^3$, $R^4$, x, y and z have the aforestated meanings. Preferred 1,2-epoxides for use herein include, but are not limited to, ethylene oxide, propylene oxide, butylene oxide and the like.

The hydrocarbyl alcohol and the at least two 1,2-epoxides are advantageously reacted to form the hydrocarbyl polyoxyalkylene hydroxide in a mole ratio ordinarily ranging from about 5 to about 30 and preferably from about 10 to about 20. The reaction is ordinarily conducted at a temperature ranging from about 90° C. to about 120° C. and preferably from about 100° C. to about 115° C. The time for preparing the hydrocarbyl polyoxyalkylene hydroxide, under preferred parameters, will generally not exceed 8 hours.

The hydrocarbyl polyoxyalkylene hydroxide is then reacted with ammonia to provide the hydrocarbyl polyoxyalkylene amine. In general, the amount of ammonia reacted with the hydrocarbyl polyoxyalkylene hydroxide will range from about 1.0 cc/min to about 3.0 cc/min and preferably from about 1.5 cc/min to about 2.5 cc/min. The temperature of this reaction will ordinarily range from about 160° C. to about 209° C. and preferably from about 190° C. to about 208° C.

Suitable carbonates corresponding of the general formula

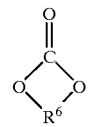

wherein $R^6$ has the aforestated meaning include, but are not limited to, ethylene carbonate, propylene carbonate, butylene carbonate, trimethylene carbonate, vinylene carbonate, 2-phenyl propylene carbonate, 3-phenyl propylene carbonate, and mixtures thereof. Preferred carbonates for use herein are ethylene carbonate, propylene carbonate, butylene carbonate, and mixtures thereof. The hydrocarbyl polyoxyalkylene amine and the carbonate react to provide the product hydrocarbyl polyoxyalkylene urethane of this invention. As one skilled in the art will readily appreciate, the reaction of the hydrocarbyl polyoxyalkylene amine with the carbonate can provide a monoalkoxylated product or a dialkoxylated product. It is particularly advantageous to provide the monoalkoxylated product as a fuel additive for use herein. Moreover, it will be understood by those skilled in the art that reaction of the hydrocarbyl polyoxyalkylene amine with an ethylenically unsaturated carbonate such as vinylene carbonate will initially produce an aldehyde-terminated intermediate. The aldehyde-terminated intermediate can be converted to the desired hydroxyl-terminated hydrocarbyl polyoxyalkylene urethane of this invention employing conventional and well known reduction reactions.

In general, the hydrocarbyl polyoxyalkylene amine is reacted with the carbonate in a mole ratio ranging from about 1 to about 50, preferably from about 2 to about 7 and more preferably from about 3 to about 6. The temperature of this reaction will ordinarily range from about 140° C. to about 190° C. and preferably from about 150° C. to about 180° C. The time period for this reaction will typically not exceed 8 hours.

The hydrocarbyl polyoxyalkylene urethane of this invention is particularly useful as an additive in an internal combustion engine fuel composition to inhibit the deposition of fuel combustion deposits in the combustion chamber and intake valves and exhaust system of an internal combustion engine. Generally, the fuel composition will contain a major amount of an internal combustion engine fuel and an effective fuel combustion deposit-inhibiting amount of at least one hydrocarbyl polyoxyalkylene urethane of this invention.

Preferred fuel compositions are those intended for, but not limited to, use in spark ignition internal combustion engines. Such fuel compositions, i.e., gasoline base stocks, ordinarily contain a mixture of hydrocarbons boiling in the gasoline boiling range of from about 90° F. to about 370° F. This fuel can consist of straight or branched chain paraffins, cycloparaffins, olefins, aromatic hydrocarbons, or mixtures thereof. The fuel can be derived from among others, straight run naphtha, polymer gasoline, natural gasoline, or from catalytically cracked or thermally cracked hydrocarbons and catalytically reformed stock. Generally, the composition and octane level of the fuel are not critical and any conventional fuel can be employed herein.

In general, the amount of the hydrocarbyl polyoxyalkylene urethane employed in the fuel composition as a fuel additive can range from about 10 to about 2000 pounds per thousand barrels (PTB), preferably from about 20 to about 1000 PTB and more preferably from about 40 PTB to about 300 PTB.

In the fuel composition, other fuel additives can be employed with the additive of this invention, including, for example, antiknock agents such as tetraethyl lead compounds, anti-icing additives, antioxidants, metal deactivators, demulsifiers and the like.

The following example is illustrative of the preparation of the hydrocarbyl polyoxyalkylene urethane of this invention.

EXAMPLE 1

A. Preparation of 9.2 Mole Propylene Oxide/5 Mole 1,2 Butylene Oxide Adduct of Nonylphenol.

Into a 10 gallon kettle were charged 4.2 pounds of nonylphenol and 57 grams of 50 percent aqueous potassium hydroxide. The reactor was then purged with prepurified nitrogen. Maintaining a nitrogen purge, the reactor was heated to 100° C. and the nonylphenolate salt dried to a water content of less than 0.1 percent using both vacuum and nitrogen stripping. A mixture of 10.3 lbs. propylene oxide and 6.9 lbs. 1,2-butylene oxide was then reacted at 115° C. at 90 psig over a six hour period. The reaction mixture was then digested at 115–120° C. to an equilibrium pressure and purged with nitrogen for 30 minutes. The alkaline product was then neutralized at 95° C. by stirring for two hours with 173 grams Magnesol 30/40 absorbent which was added in an aqueous slurry. The neutralized product was then vacuum stripped to a minimum pressure at 100–120° C., nitrogen stripped and filtered. Properties of the finished product are given in Table I below.

TABLE I

| | Properties |
|---|---|
| Acid no. mg KOH/g | <0.01 |
| Hydroxyl no. mg KOH/g | 56 |
| Water, wt. % | 0.1 max |
| Color, Pt—Co | 150 max |
| Viscosity, 40° C., eST. | 132 |

B. Preparation of Nonylphenoxypolyoxy-propylene/polyoxybutylene amine.

0.127 lb/hr of the product of step A, 0.169 lb/hr of ammonia and 6 L/hr of hydrogen were added to the reactor filled with 455 grams of a Raney nickel catalyst. The reactor was at a pressure of 2750 psig and a temperature of 205° C. The crude reactor effluent was charged to a clean dry kettle. It was then nitrogen stripped to 75° C., placed under vacuum and heated to 100° C. Analysis of the product is given in Table II.

TABLE II

| | meq/gram |
|---|---|
| Total acetylatables | 1.0 |
| Total amine | 0.96 |
| Primary amine | 0.96 |

C. Preparation of the reaction product of propylene carbonate and nonylphenoxypoly-oxypropylene/polyoxybutylene amine.

To a 1 gallon autoclave equipped with a thermometer, stirrer and nitrogen outlet, 500 grams of the product of step B and an approximately equimolar amount of propylene carbonate were charged. The mixture was initially heated sufficiently to cause the mixture reflux and thereafter heated to 150–160° C. for a period of two hours. The absence of carbonate infrared C=O stretching and the appearance of the urethane N—C=O stretch confirmed production of the hydrocarbyl polyxyalkylene urethane of this invention. The monoalkoxylated final product is represented by the following formula

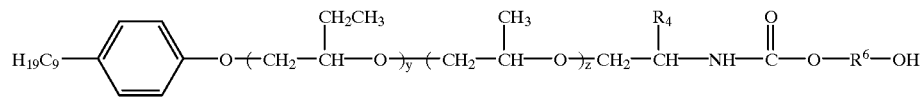

wherein the average value of y is from about 7 to about 8, the average value of z is about half that of y, i.e., from about 3.5 to about 4, $R^4$ is —$CH_3$ or —$CH_2CH_3$ and $R^6$ is —$CH_2CH(CH_3)$—. While shown as block copolymers, the propylene/butylene oxides can also be random copolymers.

What is claimed is:

1. A hydrocarbyl polyoxyalkylene urethane compound of the general formula

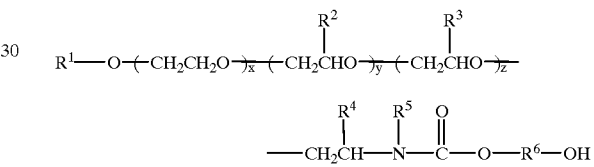

wherein $R^1$ is an alkyl, an alicyclic or an alkylalicyclic radical having from about 4 to about 30 carbon atoms or an alkylaryl where the alkyl group is from about 4 to about 30 carbon atoms; x is an integer from 0 to about 5, y is an integer from 1 to about 49, z is an integer from 1 to about 49 and the sum of x+y+z is equal to 3 to about 50; $R^2$ and $R^3$ each is different and is an alkyl group of from 1 to 4 carbon atoms and each oxyalkylene radical can be any combination of repeating oxyalkylene units to form block or random copolymers; $R^4$ is the same as $R^2$ or $R^3$; $R^5$ is hydrogen or

where $R^7$ is hydrogen or an alkyl group of from 1 to 5 carbon atoms and $R^6$ is an divalent alkylene radical of 1 to about 12 carbon atoms which is unsubstituted or substituted with at least one hydrocarbyl substituent of from 1 to about 50 carbon atoms.

2. The compound of claim 1 wherein $R^1$ is an alkylaryl where the alkyl group is from about 6 to about 24 carbon atoms.

3. The compound of claim 1 wherein $R^2$ is ethyl, $R^3$ is methyl, $R^5$ is hydrogen and $R^6$ is propylene.

4. The compound of claim 3 wherein x is equal to 0 and the ratio of y to z is from about 1.5 to about 2.

5. A method for the preparation of a hydrocarbyl polyoxyalkylene urethane which consists essentially of reacting a hydrocarbyl polyoxyalkylene amine of the general formula

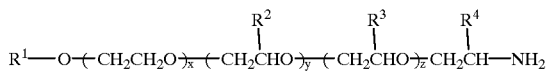

wherein $R^1$ is an alkyl, an alicyclic or an alkyl alicyclic radical having from about 4 to about 30 carbon atoms or an alkylaryl where the alkyl group is from about 4 to about 30 carbon atoms; x is an integer from 0 to about 5, y is an integer from 1 to about 49, z is an integer from 1 to about 49 and the sum of x+y+z is equal to 3 to about 50; $R^2$ and $R^3$ each is different and is an alkyl group of from 1 to 4 carbon atoms and each oxyalkylene radical can be any combination of repeating oxyalkylene units to form block or random copolymers; and $R^4$ is the same as $R^2$ or $R^3$ with a carbonate of the general formula

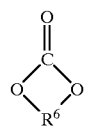

wherein $R^6$ is an divalent alkylene radical of 1 to about 12 carbon atoms which is unsubstituted or substituted with at least one hydrocarbyl substituent of from 1 to about 50 carbon atoms to provide the product hydrocarbyl polyoxyalkylene urethane of the general formula

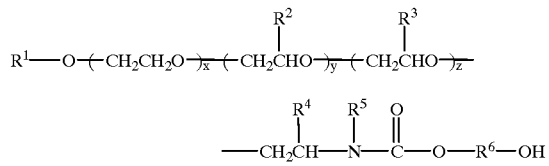

wherein $R^1$, $R^2$, $R^3$, $R^4$, $R^6$, x, y and z have the aforestated meanings and $R^5$ is hydrogen or

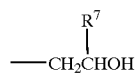

where $R^7$ is hydrogen or an alkyl group of from 1 to 5 carbon atoms.

6. The method of claim 5 wherein $R^1$ is an alkylaryl where the alkyl group is from about 6 to about 24 carbon atoms.

7. The method of claim 5 wherein $R^2$ is ethyl, $R^3$ is methyl, $R^5$ is hydrogen and $R^6$ is propylene.

8. The method of claim 7 wherein x is equal to 0 and the ratio of y to z is from about 1.5 to about 2.

9. The method of claim 8 wherein the mole ratio of the hydrocarbyl polyoxyalkylene amine to the carbonate is from about 1 to about 10.

10. The method of claim 8 wherein the reaction temperature is from about 140° C. to about 190° C.

11. A fuel composition which comprises a major amount of an internal combustion engine fuel and fuel combustion deposit-inhibiting amount of at least one hydrocarbyl polyoxyalkylene aminoalcohol of the general formula

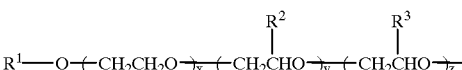
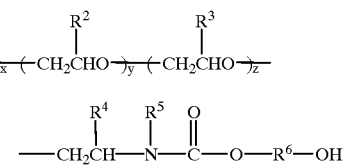

wherein $R^1$ is an alkyl, an alicyclic or an alkylalicyclic radical having from about 4 to about 30 carbon atoms or an alkylaryl where the alkyl group is from about 4 to about 30 carbon atoms; x is an integer from 0 to about 5, y is an integer from 1 to about 49, z is an integer from 1 to about 49 and the sum of x+y+z is equal to 3 to about 50; $R^2$ and $R^3$ each is different and is an alkyl group of from 1 to 4 carbon atoms and each oxyalkylene radical can be any combination of repeating oxyalkylene units to form block or random copolymers; $R^4$ is the same as $R^2$ or $R^3$; $R^5$ is hydrogen or

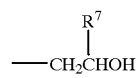

where $R^7$ is hydrogen or an alkyl group of from 1 to 5 carbon atoms and $R^6$ is an divalent alkylene radical of 1 to about 12 carbon atoms which is unsubstituted or substituted with at least one hydrocarbyl substituent of from 1 to about 50 carbon atoms.

12. The fuel composition of claim 11 wherein $R^1$ is an alkylaryl where the alkyl group is from about 6 to about 24 carbon atoms.

13. The fuel composition of claim 11 wherein $R^2$ is ethyl, $R^3$ is methyl, $R^5$ is hydrogen and $R^6$ is propylene.

14. The fuel composition of claim 13 wherein x is equal to 0 and the ratio of y to z is from about 1.5 to about 2.

15. The fuel composition of claim 14 wherein the hydrocarbyl polyoxyalkylene urethane is present in an amount from about 10 PTB to about 2000 PTB.

16. The fuel composition of claim 14 wherein the hydrocarbyl polyoxyalkylene urethane is present in an amount from about 40 PTB to about 300 PTB.

17. A method for inhibiting the deposition of fuel combustion deposits in an internal combustion engine which comprises operating the engine employing as a fuel therefor a fuel composition which comprises a major amount of an internal combustion engine fuel and a fuel combustion deposit-inhibiting amount of at least one hydrocarbyl polyoxyalkylene urethane of the general formula

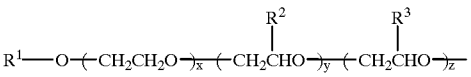
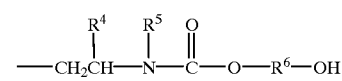

wherein $R^1$ is an alkyl, an alicyclic or analkyl alicyclicc radical having from about 4 to about 30 carbon atoms or an alkylaryl where the alkyl group is from about 4 to about 30 carbon atoms; x is an integer from 0 to about 5, y is an integer from 1 to about 49, z is an integer from 1 to about 49 and the sum of x+y+z is equal to 3 to about 50; $R^2$ and $R^3$ each is different and is an alkyl group of from 1 to 4 carbon atoms and each oxyalkylene radical can be any combination of repeating oxyalkylene units to form block or random copolymers; and $R^4$ is the same as $R^2$ or $R^3$; $R^5$ is hydrogen or

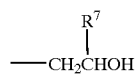

wherein $R^7$ is hydrogen or an alkyl group of from 1 to 5 carbon atoms and $R^6$ is an divalent alkylene radical of 1 to about 12 carbon atoms which is unsubstituted or substituted with at least one hydrocarbyl substituent of from 1 to about 50 carbon atoms.

18. The method of claim 17 wherein $R^1$ is a alkylaryl where the alkyl group is from about 6 to about 24 carbon atoms.

19. The method of claim 17 wherein $R^2$ is ethyl, $R^3$ is methyl, $R^5$ is hydrogen and $R^6$ is propylene.

20. The method of claim 19 wherein x is equal to 0 and the ratio of y to z is from about 1.5 to about 2.

21. The method of claim 20 wherein the hydrocarbyl polyoxyalkylene urethane is present in an amount from about 10 PTB to about 2000 PTB.

22. The method of claim 20 wherein the hydrocarbyl polyoxyalkylene urethane is present in an amount from about 40 PTB to about 300 PTB.

* * * * *

UNITED STATES PATENT AND TRADEMARK OFFICE
CERTIFICATE OF CORRECTION

PATENT NO. : 6,001,142
DATED : December 14, 1999
INVENTOR(S) : Russo et al.

Page 1 of 1

It is certified that error appears in the above-identified patent and that said Letters Patent is hereby corrected as shown below:

Column 2,
Line 26, change "alkyl alicyclic" to -- alkylalicyclic --.
Line 58, change "$R_1$" to -- $R^1$ --.

Column 3,
Lines 6-10, delete first formula down and substitute therefor

Line 61, change "alkyl alicyclic" to -- alkylalicyclic --.

Column 4,
Line 1, change "$R_1$" to -- $R^1$ --.
Line 40 (third formula down), change "$R_4$" to -- $R^4$ --.

Column 8,
Line 9, change "polyxyalkylene" to -- polyoxyalkylene --.
Line 14, (first formula down), change "$R_4$" to -- $R^4$ --.

Column 9,
Line 7, change "alkyl alicyclic" to -- alkylalicyclic --.

Column 10,
Line 60, change "analkyl alicyclicc" to -- an alkylalicyclic --.

Signed and Sealed this

Eighth Day of January, 2002

Attest:

JAMES E. ROGAN
Attesting Officer
Director of the United States Patent and Trademark Office